May 18, 1965

S. LOOSLI 3,184,029

MATERIAL HANDLING APPARATUS

Filed Feb. 12, 1962

STANLEY LOOSLI
INVENTOR

HUEBNER & WORREL
ATTORNEYS

BY

*Richard M. Worrel*

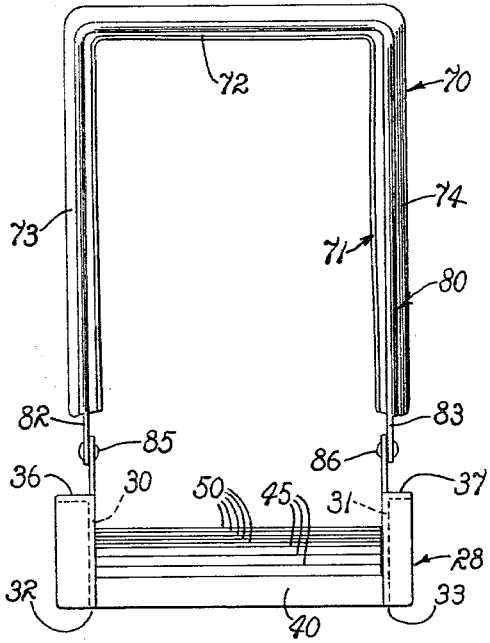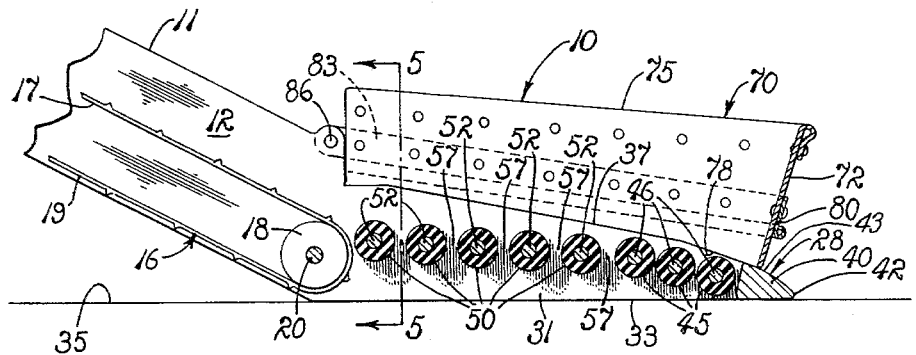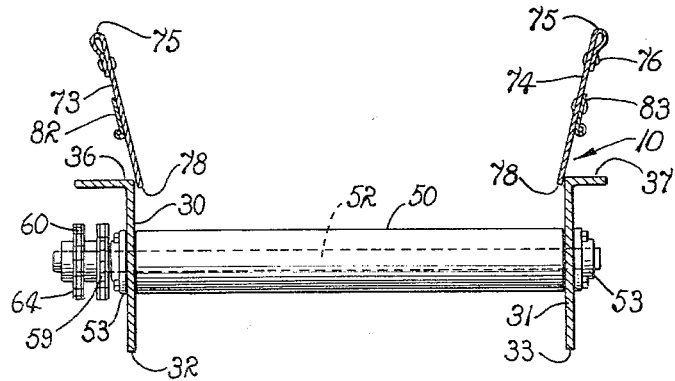

3,184,029
MATERIAL HANDLING APPARATUS
Stanley Loosli, Ashton, Idaho, assignor of one-half each to Herbert A. Huebner, Los Angeles, Calif., and Richard M. Worrel, Fresno, Calif.
Filed Feb. 12, 1962, Ser. No. 172,696
7 Claims. (Cl. 198—9)

The present invention relates to a material handling apparatus for elevationally transporting bulk material with a minimum of damage thereto and more particularly to such a device having improved loading facilities so that even easily bruised, abraded and otherwise damaged articles can be loaded and elevationally transported with minimum impairment of the quality thereof.

The apparatus provides means for the scoop loading of loose material characterized by the ability to convey material from a position of repose upwardly to a conveyor in such a manner as to avoid entanglement and injury and which can be readily modified to provide a hopper for deposit loading rather than scoop loading.

Elevational piling machines have long been employed to displace piles of agricultural crops from the field or storage areas into transporting trucks and the like. Additionally, coal, gravel, rock, sand, cement and other loose materials are similarly displaced from loose piles into transporting or other packaging devices. The known machines have been quite successful for handling durable material and even relatively successful for handling delicate or perishable material which could be lifted and deposited therein. However, they have not been satisfactory for the scoop loading of the delicate and perishable materials. To scoop load, it is necessary to slide a scoop mechanism under the material. So that the scoop mechanism need not elevate the material an excessive distance and aggravate the damage incident thereto, an elevating conveyor is provided at as low an elevation as practical to receive the material from the scoop mechanism. Since the minimum distance that the upper run of a conveyor can be spaced above a supporting surface is dependent upon how tightly the conveyor can make a return bend, such machines have employed chain conveyors to receive from the scoop mechanisms. Belt conveyors have been known to handle delicate and perishable materials much more safely than chain conveyors but they require much more height to make their return bends. Thus, in previous material elevating mechanisms, when belt conveyors were used, the scoop mechanisms had to lift the material an excessive distance for deposit thereon with resultant excessive damage by the scoop mechanism. When chain conveyors were used to minimize the lifting distances of the scoop mechanism, the inherent damaging effects of the chain conveyors were incurred.

An object of the present invention is, therefore, to provide an improved material handling apparatus adapted to elevate material with minimum damages thereto.

Another object is to provide an improved scoop mechanism for material handling apparatus adapted to pick up and to elevate material with such a minimum of damage that it is practical to elevate the material high enough to deliver to the upper run of a belt conveyor.

Another object is to make it practical to utilize belt conveyors in conjunction with scoop mechanisms for easily damaged materials.

Another object is to provide a material handling apparatus including a scoop mechanism adapted for adjustment selectively to scoop material from a support surface or to receive material deposited thereon.

Another object is to provide such an apparatus having a retractable hopper adapted for cooperative utilization with the scoop mechanism.

Another object is to provide a scoop mechanism utilizing rotated transporting rollers but which can handle potatoes with their vines attached and like loads without the entanglement and wrapping previously associated with such rollers.

Another object is to provide a material handling apparatus which utilizes a plurality of material conveying rollers which are successively accelerated in the direction of load travel to prevent wrapping of material about the rollers.

Other objects and advantages of the present invention will become more fully apparent in the following description in the specification.

In the drawings:

FIG. 3 is a front elevation of the pick up apparatus of the preceding figures.

FIG. 4 is a longitudinal vertical section taken on line 4—4 of FIG. 1 showing the hopper lowered to an operating position.

FIG. 5 is a transverse vertical section through the handling apparatus and the hopper taken on line 5—5 of FIG. 4.

Figure 1:
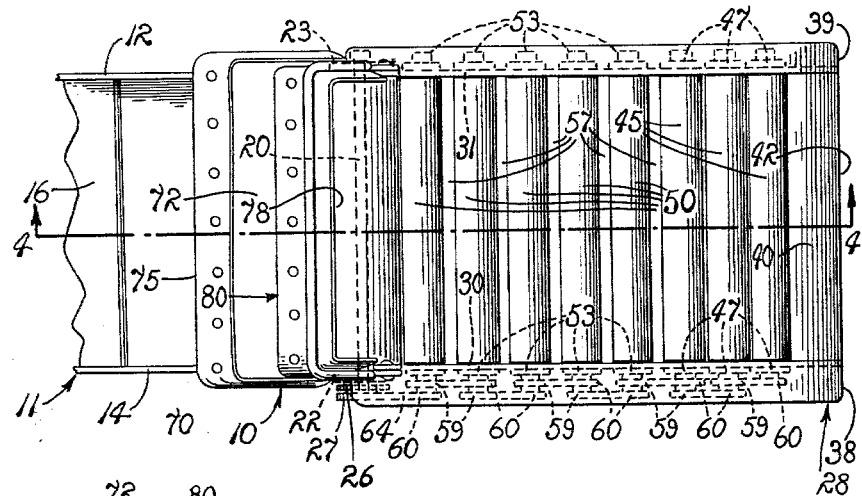
FIG. 1 is a top plan view of the material handling apparatus of the present invention having a hopper shown thereon in a retracted position.

Referring more particularly to the drawings, a material handling apparatus embodying the principles of the present invention is indicated generally at 10. The apparatus includes an elevating conveyor 11 having a pair of spaced opposite side walls 12 and 14 which are adapted to be supported on a mobile frame, not shown, for elevational and pivotal adjustment. The conveyor also includes a belt 16 having an upper run 17 supported by a transversely disposed roller 18 and trained thereabout to include a lower run 19. Only the lower portion of the conveyor is shown, it being understood that the opposite upper end thereof is provided with a roller similar to the roller 18. The roller 18 is mounted upon a shaft 20 having opposite ends journaled in, and extended outwardly, of the side walls 12 and 14 by suitable bearing blocks 22 and 23, respectively. The shaft 20 extends outwardly of the bearing block 22 and mounts a pair of sprockets 26 and 27 in fixed relation thereon. The sprocket 26 mounts a chain which is trained about a motor drive sprocket, not shown, mounted on the conveyor to drive the roller 18 and the conveyor belt 16 in circuitous movement between its upper and lower rollers. It is also noted that the belt 16 preferably provides a plurality of equally spaced transversely disposed ribs thereon to add rigidity to the belt and for material gripping or anti-rolling purposes.

A scoop portion or mechanism of the material handling apparatus 10 is generally indicated at 28. It is provided with a pair of opposite side plates 30 and 31 pivotally mounted on, and forwardly extended from, the side walls 12 and 14 respectively of the conveyor. Any suitable control means, such as that shown in my copending application Serial No. 106,792 filed May 1, 1961 may be employed for pivotally positioning said scoop portion on the conveyor 11. The side plates include substantially horizontally disposed lower surfaces 32 and 33 which are adapted to rest in slidable engagement upon a support surface indicated at 35. The plates 30 and 31 include outwardly extended upper surfaces 36 and 37, respectively, forwardly declined from their rearward portions adjacent to the conveyor 16 and terminated in substantially pointed forward ends 38 and 39 convergent with their respective lower surfaces 32 and 33.

A material scoop or elevating blade 40 having a forwardly facing edge portion 42 rigidly interconnects the forward ends 38 and 39 of the side plates 30 and 31 for intimate sliding engagement with the supporting surface 35. The blade also includes an upper ramp portion 43. A plurality of elongated cylindrical forward rollers 45 are transversely rotatably mounted between the side plates on suitable shafts 46 journaled in a plurality of bearing blocks 47 secured to the plates. The forward rollers are successively disposed immediately rearwardly of the elevating blade 40, with their respective peripheries being positioned in closely spaced relation to each other. Furthermore, the shafts 46 for the three rollers are positioned in a common plane rearwardly inclined in substantial conformance with the upper flanged surfaces 36 and 37 of the plates.

A plurality of cylindrical rearward rollers 50 are rotatably mounted between the side plates 30 and 31 on individual shafts 52 journaled in bearing blocks 53 in spaced longitudinal arrangement between the rollers 45 and the lower end of the conveyor belt 16. The shafts 52 are also disposed on a common plane rearwardly inclined from the rollers 45 toward the conveyor belt 16. It is noted that the upper peripheries of the three rollers 45 are tangential to a rearwardly inclined plane substantially continuous with the ramp portion of the blade 40. It is also noted that the upper peripheries of the five rollers 50 are tangential to a rearwardly inclined plane. The plane of the rollers 45 is somewhat more precipitously inclined than the plane of the rollers 50 and the planes preferably intersect in the vicinity of the upper periphery of the rearwardmost of the rollers 45. The rollers 45 are closely adjacent to each other. The rollers 50 are peripherally spaced longitudinally of the scoop mechanism to provide a plurality of passages 57 between their adjacent peripheries.

Figure 2:
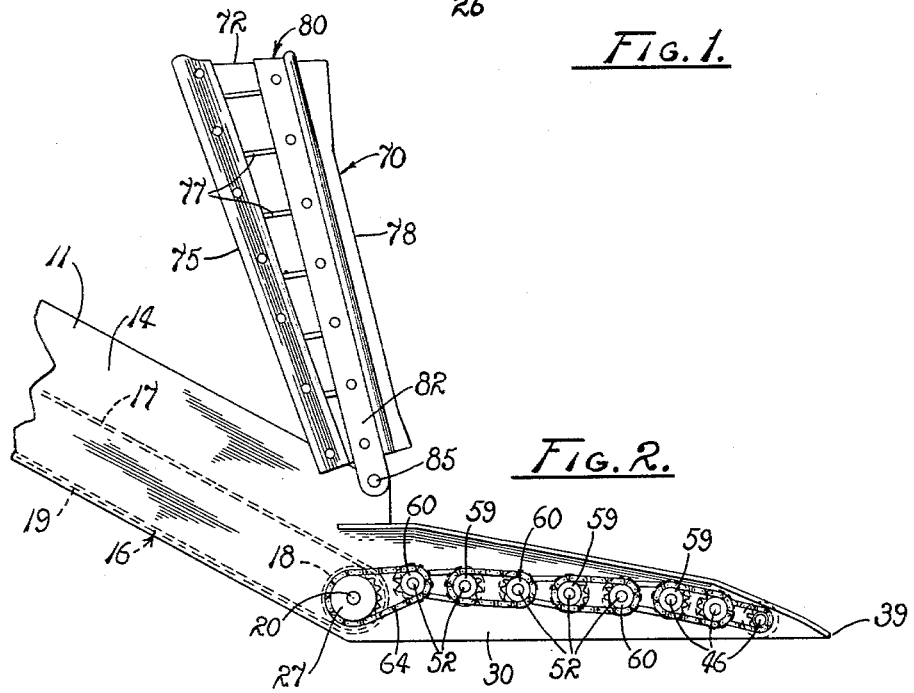
FIG. 2 is a side elevation of the pick up apparatus of FIG. 1.

The closely adjacent rollers 45 are rotatably driven with their upper peripheries traveled rearwardly of the scoop mechanism at substantially the same speed. It is significant that the spaced rollers 50 are rotated with their upper peripheries traveled rearwardly of the scoop mechanism at successively faster peripheral velocities rearwardly of the scoop mechanism. This is conveniently accomplished by mounting a drive sprocket 59 and a driven sprocket 60 on each of the shafts 46 and 52, as best shown in FIGS. 1 and 2. The drive and driven sprockets 59 and 60 on the shafts 52 have the same number of teeth and the same circumferential dimensions. The driven sprockets 60 on the shafts 46 have uniformly greater numbers of teeth and corresponding greater circumferential dimensions than the drive sprockets 59 on said shafts. For example, it has been found suitable in an operational embodiment of the subject invention to employ drive and driven sprockets on the shafts 52 each having twelve teeth while employing driven sprockets on the shafts 46 having twelve teeth and drive sprockets on said shafts having eleven teeth. Endless chains 62 are trained about the respective drive and driven sprockets 59 and 60, as shown. The entire system is conveniently motivated by an endless chain 64 trained about the sprocket 27 and the driven sprocket 60 on the rearwardmost shaft 46. So linked, the rollers 45 are driven at substantially the same peripheral velocity while successive rollers 50 rearwardly of the scoop mechanism are driven at progressively higher velocities.

A material receiving hopper 70 is adapted to be operationally positioned in superimposed relation upon the scoop portion 28 to convert the scoop for deposit loading. The hopper includes a U-shaped wall 71 having a forward panel 72 interconnecting a pair of opposite side panels 73 and 74. The wall further includes an upper arcuately curved edge 75 which is formed by folding the forward and side panels of the wall outwardly and downwardly and fastening the same by a plurality of suitable rivets 76. The wall is preferably constructed of a flexible belting material similar to that employed in the conveyor belt 16 providing ribs 77 to impart strength. As shown in FIG. 5, the wall 71 includes an inwardly convergent lower edge 78 which is adapted to be received within the upper edges 36 and 37 of the side plates 30 and 31. A rigid U-shaped frame 80 is rigidly secured to the wall 70 in bounding relation thereto and provides a pair of opposite rearwardly extended mounting arms 82 and 83. The mounting arms are pivotally mounted on the side walls 12 and 14 at 85 and 86, respectively, for swinging the hopper between the upwardly extended retracted position of FIG. 2 and the operating position of FIG. 4. It will be noted that when the hopper is lowered to operating position, the rollers 45 and 50 constitute a bottom therefor.

*Operation*

The operation of the described embodiment of the present invention is believed clearly apparent and is briefly summarized at this point. When it is desired to pick up a pile of material, such as rocks, coal, potatoes, apples, lettuce or the like, not shown, the conveyor 11 is motivated to slide the scoop portion 28 thereof along the support surface 35 and into the pile while the conveyor 11 and the rollers 45 and 50 are actuated. During such movement, the elevating blade 40 is effective to wedge between the material and the support surface 35 whereby the upper ramp portion 43 lifts such material rearwardly upwardly onto the forward set of rollers 45. The rearward travel of the upper peripheries of the rollers 45 carries the material to the rollers 50. The rollers 45 are closely spaced and permit the descent of little or no dirt or extraneous material therebetween. As the material reaches the rollers 50, it is rearwardly accelerated by the successively increased peripheral velocities of said rollers. The passages 27 between the adjacent peripheries of the rollers 50 permit dirt and other extraneous material to pass therethrough for discharge.

While the scoop mechanism has been described in conjunction with an elevator 11 for picking up bulk material from a supporting surface, in an embodiment commonly known as a "piler," it is to be understood that the scoop mechanism and conveyor may be embodied in a harvesting apparatus for potatoes or the like of the type shown and described in my co-pending patent application, Serial No. 132,929, entitled Digging and Elevating Apparatus for Harvesters, filed August 21, 1961, now abandoned. In such event, the blade 40 becomes a digging blade which digs potatoes from the soil and elevates them with their vines to the rollers 45. As before, the rollers 45 carry the potatoes and vines to the rollers 50. This distance of transport is short to avoid entanglement of the vines with the rollers. In prior devices, the use of rollers for such purpose has been impractical because of the distance required to elevate the potatoes and vines for discharge onto the upper run of an associated conveyor. However, in the instant invention, the rollers 45 discharge the potatoes and vines onto the rollers 50 relatively closely to the blade 40. The rollers 50 are spaced for the descent of dirt and other extraneous material therebetween. Heretofore, such spacing resulted in the descent of vines between the rollers which promptly wrapped about the rollers until they were jammed and inoperable. The present invention successfully utilizes the spaced rollers in such operational environment by driving each successive roller at a higher peripheral velocity. The result is that the potatoes and their vines are accelerated from the first roller 50 to the conveyor 11 and, in actual practice, wrapping and entanglement of the vines is avoided.

In some instances, it is desirable to load the conveyor by deposit rather than by scooping action. This may be desirable when a pile of material is inaccessible to the conveyor or where the source of the material is elevated for convenient gravitational descent. The apparatus of the present invention is readily adapted for such use by swinging the hopper 70 from its retracted position of FIG. 2 to the lowered operating position of FIG. 4. In such position, the forward panel 72 of the hopper is effective to block the forward open end of the scoop 28 while the side panels 73 and 74 are disposed in intimate contact with the side plates 30 and 31 thereof. So disposed, the hopper is adapted to accommodate a large volume of material deposited therein and permits the conveying rollers 45 and 50 to propel the lowermost portion of the material rearwardly onto the conveyor 11 in the advantageous manner, previously described.

From the foregoing, it is readily apparent that the material handling apparatus of the present invention is readily adapted to be either directly positioned within a pile of material to be displaced or to be loaded by deposit of material therein as well as to be utilized in potato harvesters and the like. The conveying portion provided by the rollers 50 of the scoop 28 are spaced sufficiently to permit a measure of cleaning of the material passing thereover and are successively accelerated to preclude wrapping of the material about individual rollers and clogging thereof. Such results are attained independently of how the material is received. Additionally, the structure of the present invention permits sufficient elevation of the material by the rollers, without the excessive damage normally associated therewith and to enable the utilization of a belt-type conveyor. As discussed, the use of a belt-type conveyor avoids the usual abrading of the material handled as is commonly experienced with chain conveyors conventionally employed in prior pick up mechanisms.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. In a material handling apparatus having an elongated power driven inclined conveyor mounted for earth traversing movement and having a lower end disposed in the direction of such movement, the combination of a pair of side plates mounted on the forward end of the conveyor and forwardly extended therefrom for pivotal elevational movement, a pick-up blade disposed in a predetermined inclined plane interconnecting the forwardly extended ends of the side plates, a plurality of material conveying rollers mounted between the plates in substantially parallel relation to the blade and between the blade and the conveyor, said rollers having upper peripheries disposed in a substantially common inclined plane continuously extended from said plane of the blade to the conveyor, and a drive linkage connected to the conveyor and to the rollers rotating the rollers with the upper peripheries thereof traveled toward the conveyor and with successive rollers having increased peripheral velocities in the direction of the conveyor.

2. A material handling apparatus comprising a pick-up blade disposed in a predetermined inclined plane, a series of substantially parallel rollers mounted adjacent to the blade, said rollers having upper peripheries disposed in substantial tangential relation to an inclined plane continuously extended from the plane of the blade, a conveyor having a lower end disposed adjacent to the rollers and below said inclined plane, drive means having driving connection to the rollers rotating said rollers successively at progressively increased peripheral velocities in the direction of the conveyor from the blade, and a substantially U-shaped hopper having a pair of spaced side walls interconnected by an end wall, the side walls being pivotally mounted on the lower end of the conveyor for pivotal movement of the hopper between a material receiving position with the walls in material confining relation to the blade and the rollers and an upwardly retracted position removed from the blade and rollers.

3. A material handling apparatus comprising a pick-up blade disposed in a predetermined inclined plane, an inclined conveyor having a lower end in horizontally spaced relation to the blade disposed at a height above the blade, means mounting the conveyor and blade for earth traversing movement, a series of substantially parallel rollers mounted in said means between the blade and the conveyor having upper peripheries disposed in an inclined plane continuously extended from said plane of the blade to the conveyor, means having driving connection to the rollers successively rotating the rollers from the blade to the conveyor at progressively increased peripheral velocities, and an auxiliary substantially U-shaped hopper having a pair of substantially parallel side walls interconnected by an end wall, the side walls of the hopper being pivotally mounted at the lower end of the conveyor for pivotal movement between a material receiving position with the side walls in material confining relation with the rollers and the end wall in material confining relation with the blade and an upwardly retracted position.

4. In a material handling apparatus having an elongated power driven inclined conveyor mounted for earth traversing movement and having a lower end disposed in the direction of such movement, the combination of a pair of side plates mounted on the forward end of the conveyor and forwardly extended therefrom for pivotal elevational movement, a pick-up blade disposed in a predetermined inclined plane interconnecting the forwardly extended ends of the side plates, a plurality of material conveying rollers mounted between the plates in substantially parallel relation to the blade and between the blade and the conveyor, said rollers having upper peripheries disposed in a substantially common inclined plane continuously extended from said plane of the blade to the conveyor, a drive linkage connected to the conveyor and to the rollers rotating the rollers with the upper peripheries thereof traveled toward the conveyor and with successive rollers having progressively increased peripheral velocities in the direction of the conveyor from the blade, and a substantially U-shaped hopper having a pair of spaced walls pivotally mounted on the lower end of the conveyor for movement of the hopper between an upwardly retracted position and a material receiving position rested downwardly in material confining engagement with the side plates and the blade.

5. A material handling apparatus, adapted to be motivated into a pile of loose material in a predetermined direction of travel toward the pile along a support surface on which such material is rested and to effect elevational displacement of the material therefrom, comprising an inclined conveyor having opposite upper and lower ends; a continuous resiliently flexible belt mounted on said conveyor for circuitous movement between the ends thereof and having a material receiving portion adjacent to said lower end; a material engaging scoop mounted adjacent to the lower end of the conveyor in forwardly outwardly extended relation therefrom and adapted slidably to engage said support surface during motivation of the apparatus; a material elevating blade disposed on said scoop having an upper rearwardly inclined ramp portion to gather and lift such material from the support surface during said movement of the apparatus in said predetermined direction of travel; a plurality of elongated cylindrical rollers transversely mounted in said scoop for rotation on respective individual axes, said rollers having peripheries affording respective upwardly presented portions disposed in a common plane rearwardly inclined and extended to the material receiving portion of the flexible belt in substantially coplanar relation with the ramp portion of said elevating blade; means for individually rotatably driving said rollers wherein successive rollers are driven at an increased speed over the preceding adjacent roller to provide a continuously accelerated movement of material therealong thereby to preclude wrapping of such material about individual rollers; and a material constraining wall pivotally mounted on said conveyor between a position opening said scoop and a position closing the same for manual loading.

6. A material handling apparatus comprising an elongated power driven inclined conveyor mounted for earth traversing movement and having a lower end disposed in the direction of such movement, a pair of side plates mounted on the lower end of the conveyor having ends forwardly extended therefrom for pivotal elevational movement, a pick-up blade interconnecting the forwardly extended ends of the side plates, and a plurality of material conveying rollers mounted between the plates in substantially parallel relation to the blade and between the forwardly extended ends of the plates and the conveyor with the rollers having upper peripheries disposed in a substantially common inclined plane continuously extended from the blade to the conveyor.

7. A material handling apparatus comprising an elongated power driven inclined conveyor mounted for earth traversing movement and having a lower end disposed in the direction of such movement, a pair of side plates mounted on the lower end of the conveyor having ends forwardly extended therefrom for pivotal elevational movement, a transversely extended pick-up blade interconnecting the forwardly extended ends of the side plates, and a plurality of material conveying rollers having opposite ends individually journaled in said side plates between the forwardly extended ends of the plates and the conveyor with the rollers having upper peripheries disposed in a substantially common inclined plane continuously extended from the blade to the conveyor.

References Cited by the Examiner
UNITED STATES PATENTS

| | | | |
|---|---|---|---|
| 587,725 | 8/97 | Gibbons | 171—133 |
| 947,592 | 1/10 | Gilman | 198—204 |
| 1,249,445 | 12/17 | Meador | 171—133 |
| 1,554,725 | 9/25 | Hochreiter | 198—7 |
| 1,864,484 | 6/32 | Currie | 171—133 |
| 2,624,997 | 1/53 | Orendorff | 171—131 |
| 2,709,011 | 5/55 | Radin | 198—9 |
| 2,718,296 | 9/55 | Johnson | 198—204 |
| 2,844,240 | 7/58 | Buck | 198—7 |
| 2,959,271 | 11/60 | Adamson | 198—110 |
| 2,983,362 | 5/61 | Crist | 198—57 |

SAMUEL F. COLEMAN, *Primary Examiner.*

WILLIAM B. LA BORDE, ERNEST A. FALLER, Jr.,
*Examiners.*